US008170777B2

(12) United States Patent
Fernitz et al.

(10) Patent No.: US 8,170,777 B2
(45) Date of Patent: May 1, 2012

(54) INDICATING SYSTEM AND METHOD FOR DETERMINING AN ENGINE PARAMETER

(75) Inventors: Gernot Fernitz, Lannach (AT); Klaus Leitmeier, Graz (AT); Josef Moik, Graz (AT); Rüdiger Teichmann, Hart B. Graz (AT); Klaus-Christoph Harms, Thal/Graz (AT); Martin Rzehorska, Peggau (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 12/449,468

(22) PCT Filed: Feb. 4, 2008

(86) PCT No.: PCT/EP2008/051309

§ 371 (c)(1),
(2), (4) Date: Sep. 23, 2009

(87) PCT Pub. No.: WO2008/098852

PCT Pub. Date: Aug. 21, 2008

(65) Prior Publication Data

US 2010/0030446 A1 Feb. 4, 2010

(30) Foreign Application Priority Data

Feb. 15, 2007 (AT) ................................. GM97/2007

(51) Int. Cl.
*F02D 45/00* (2006.01)
*G01M 15/06* (2006.01)
*G06F 19/00* (2011.01)

(52) U.S. Cl. ...................... 701/111; 73/114.26; 702/189

(58) Field of Classification Search ............... 73/114.27, 73/114.26, 114.16, 114.24, 114.25; 701/101, 701/113, 114, 115, 110, 111; 123/406.58, 123/406.6, 479, 613, 681, 682; 702/182, 702/183, 189–197

See application file for complete search history.

(56) References Cited

U.S. PATENT DOCUMENTS

| | | | | | |
|---|---|---|---|---|---|
| 4,502,446 | A | * | 3/1985 | Kanegae et al. | 123/479 |
| 4,744,243 | A | | 5/1988 | Tanaka | |
| 4,747,389 | A | * | 5/1988 | Yuzawa et al. | 123/643 |
| 4,913,121 | A | * | 4/1990 | Shimomura et al. | 123/681 |
| 4,924,830 | A | * | 5/1990 | Abe | 73/114.27 |
| 4,926,822 | A | * | 5/1990 | Abe et al. | 123/406.62 |
| 4,962,328 | A | | 10/1990 | Wöss et al. | |
| 5,076,249 | A | * | 12/1991 | Ikeuchi et al. | 123/613 |
| 5,165,380 | A | * | 11/1992 | Okamura | 123/613 |
| 5,355,865 | A | * | 10/1994 | Okamura | 123/613 |

(Continued)

FOREIGN PATENT DOCUMENTS

| | | |
|---|---|---|
| AT | 001519 | 6/1997 |
| DE | 4406962 | 9/1994 |
| DE | 19632490 | 3/1997 |
| DE | 19713182 | 10/1998 |

OTHER PUBLICATIONS

English Abstract of AT-001519.
English Abstract of DE 19713182.

(Continued)

*Primary Examiner* — Willis Wolfe, Jr.
*Assistant Examiner* — Johnny Hoang
(74) *Attorney, Agent, or Firm* — Dykema Gossett PLLC

(57) ABSTRACT

To reduce the complexity of an indicating system 6 on an internal combustion engine for determining a parameter, the invention provides that on the basis of the measured variable a computing unit 8 for the indicating system 6 computes crank angle information, and on the basis of the crank angle information thus computed and the measured variable determines an engine parameter.

15 Claims, 2 Drawing Sheets

U.S. PATENT DOCUMENTS

| | | | | |
|---|---|---|---|---|
| 5,402,675 | A | 4/1995 | Entenmann et al. | |
| 6,230,096 | B1 * | 5/2001 | Nishimoto | 701/113 |
| 6,889,540 | B2 * | 5/2005 | Yonezawa et al. | 73/114.26 |
| 6,955,697 | B1 | 10/2005 | Hsu | |
| 2002/0092499 | A1 | 7/2002 | Kargillis et al. | |
| 2003/0188714 | A1 * | 10/2003 | Yamamoto et al. | 123/435 |
| 2005/0205022 | A1 * | 9/2005 | Ito et al. | 123/27 GE |

OTHER PUBLICATIONS

English Abstract of DE 4406962.

English Abstract of DE 19632490.

A. J. Martyre et al., "The Combustion Process and Combustion Analysis" in *Engine Testing Theory and Practice*, Third Edition (2007), Elsenier (UK), Chapter 14, (pp. 282-307).

* cited by examiner

INDICATING SYSTEM AND METHOD FOR DETERMINING AN ENGINE PARAMETER

BACKGROUND OF THE INVENTION

1. Field of the Invention

The present invention relates to an indicating system for determining at least one engine parameter which includes a sensor unit that records a measured variable having a component that is dependent on the crank angle, and a computing unit that is connected to the sensor unit via an input, and further relates to an associated method for determining a parameter, and use in engine control.

2. The Prior Art

A complex sensor system and indicating technique may be used on engine test benches to obtain any desired engine parameter—understood to mean characteristic values and parameters of the internal combustion engine (diesel or spark ignition engine, for example) to be tested, or the operating characteristics thereof (during an operating cycle, for example)—or to compute same from measured values. The indicating system also generally includes a signal amplifier which appropriately processes, for example amplifies, conditions, filters, and/or digitizes, a sensor signal for further use. For certain sensors, such as the piezoelectric cylinder pressure sensors which are particularly important for the indicating technique, a charge amplifier is generally used as a signal amplifier. However, it is also possible to use, for example, strain gauges, piezoresistive pressure sensors, structure-borne noise sensors, sensors for sonic and ultrasonic emission analysis, ion current probes, flame radiation sensors, sensors for needle, valve, or piston lift, etc., each of which uses associated signal amplifiers. The necessary engine parameters are then often computed from the measured variables such as cylinder pressure, crank angle, etc., in separate downstream processing units, or measured variables such as cylinder pressure are evaluated on a time basis or on the basis of the measured crank angle for determining the engine parameters, whereby the computations and evaluations may also be performed online, i.e., during engine operation, or offline, i.e., after the fact. As a result, the processing units require their own input for a crank angle signal, for example from an angle sensor. Nevertheless, some internal parameters may also be determined without the crank angle information. For example, on the basis of the measured variation in the cylinder pressure over time, parameters such as peak pressure, combustion noise, knock intensity, frequency components, time differences between significant signal characteristics, etc., may also be determined without crank angle information. However, for their determination, even if only as an approximation, other important parameters such as the indicated average pressure, mass conversion points, course of combustion, combustion center of gravity, components of order analysis, ignition delay in degrees of the crank angle, etc., absolutely require, in addition to the cylinder pressure, crank angle information such as rotational speed, duration of one revolution of the crankshaft, instantaneous angular velocity, duration of an operating cycle, duration of an operating cycle divided by the number of cylinders, or an instantaneous rotational angle in any given angular resolution. Measurement of the crank angle information naturally increases the complexity of the sensor system. On engine test benches this complexity is often justified, since as a rule the most accurate determination possible of certain parameters and the most precise evaluation possible of the engine operation is desired, although for cost reasons the level of complexity is frequently minimized for this application. Another problem, of course, is the space requirement for a complex sensor system and indicating technique, and the fact that the necessary sensors can usually be retrofitted on the engine only with a great level of effort.

In principle, of course, it is also known to use an essentially periodic measurement signal, for example from a cylinder pressure sensor, to derive crank angle information. AT 388 830 B, for example, discloses that the drift compensation device of a charge amplifier circuit is triggered corresponding to the period of a measurement signal. The periodic trigger signals for the triggering device (i.e., essentially crank angle information) may be related to a crankshaft, either internally on the basis of the measurement signal, or externally on the basis of a connected signal transmitter.

The article "Simulationsmodelle von Verbrennungsmotoren für Echtzeitan-wendungen" [Simulation models for real-time applications in internal combustion engines], Gheorghiu V., Haus der Technik e.V., Session No. E-30-202-056-8, 1998 describes a method for computing crank angle information from the variation of pressure measured over time, also taking into account irregularities in the crankshaft revolutions.

Of course, these methods for determining crank angle information from an essentially periodic measurement signal provide only approximations of the required crank angle information. The resulting error depends essentially on the methods used for determining the crank angle information. For applications in the area of engine test benches, such approximation methods are generally unsuitable and therefore have not been considered. However, for use in the area of vehicle onboard measurement or indicating techniques or in the low-end indicating market, such indicating techniques are too costly and complicated.

Charge amplifiers having integrated peak value determination on the basis of the measurement signal are currently known. Such charge amplifiers have limited usefulness, however, since they allow only a single engine parameter to be determined and provide no flexibility. However, various engine parameters are generally required for meaningful use.

The object of the present invention is to provide an indicating arrangement which has a particularly simple and compact design, is advantageous, easy to install and operate, and still allows important engine parameters to be determined, and an associated method.

SUMMARY OF THE INVENTION

For the indicating arrangement and the associated method this object is achieved according to the invention by the fact that the computing unit computes crank angle information on the basis of the measured variable recorded by the sensor unit, and on the basis of the measured variable and the computed crank angle information, determines at least one engine parameter which requires knowledge of crank angle information and emits same as an output signal to an output.

In contrast to use of the high-end indicating technology in the area of engine test benches, for use in the low-end indicating market, i.e., for very inexpensive test benches, for example, or also in onboard measuring techniques for mass-produced vehicles, for example for parameterization, calibration, diagnosis, monitoring, control, etc. of an internal combustion engine, the complexity and cost of the indicating technology should preferably be low. For the reasons described above this cannot be achieved using a conventional indicating system or sensor system. Heretofore it has been necessary to use known indicating devices, for example a cylinder pressure sensor, to record measured values and send them to an engine control unit (ECU) or a processing unit where the measured values are evaluated, often taking into account other measured values such as the measured crank angle, for example, and optionally using stored characteristic maps. The sensor system necessary for this purpose naturally increases the cost and complexity of installation, start-up, maintenance, and parameterization of the sensors and the engine control unit or processing unit. These disadvantages are avoided by use of an indicating system according to the invention by the fact that the required parameters are determined with integration into the indicating system, without additional input of the crank angle (which would mean an additional costly sensor system in addition to necessary signal inputs), since it is known that the accuracy thus achieved in determining the parameters for use in the area of vehicle onboard measuring techniques or in the low-end indicating market, as well as for other applications for which lower accuracy is acceptable, is sufficient. An indicating system according to the invention results in particular in low capital costs, simpler installation in the vehicle, easier parameterization, a time advantage for start-up and measurement, capability for transfer to other systems, and an increase in quality with simultaneous time savings in engine development (as the result of avoiding iteration loops). Furthermore, such an indicating system does not require expert knowledge for operation. A targeted search for malfunctions (of components or the software structure of the engine control system) is also possible using this application. In addition, due to the fact that practically any given parameter can be determined, such an indicating system offers very flexible application possibilities.

For certain sensor units it is advantageous to provide a signal amplifier, in particular a charge amplifier, in the indicating system between the sensor unit and the computing unit which appropriately prepares, i.e., amplifies, conditions, filters, and/or digitizes, the sensor signal.

The flexibility and benefit of an indicating system according to the invention is further increased in the computing unit when it is provided that additional parameters, for example peak pressure, combustion noise, or knock intensity, are determined solely from the measured variable, i.e., without the use of crank angle information.

It may also be advantageous to equip an evaluation unit with multiple inputs for various measurement channels, and to provide each measurement channel or each group of measurement channels having at least one measurement channel with its own computing unit. It may be provided that these multiple computing units are also able to communicate with one another and thus exchange data. However, a single computing unit may also be advantageously used for all measurement channels.

Multiple measurement channels are of great importance, for example, for indicating in a multicylinder engine: each cylinder is provided with its own cylinder pressure sensor, and the multiple cylinder pressure courses are intended to be evaluated based on crank angle information that is valid for all. In this case, of course, for determining the crank angle information it is particularly advantageous for not only one, but, rather, multiple signals having a component that is dependent on the crank angle to be present, whereby use may also be made of a-priori knowledge, generally present, of the geometry of the engine, and thus of the offset in the time or crank angle between the individual signals.

When all units of the indicating system are situated in a common housing, a particularly compact device is obtained which is easy to use and which in particular also reduces the complexity of cabling outside the device. Such a device may be regarded as an "intelligent sensor," since it supplies the necessary signals or data and engine parameters, and does not require downstream evaluation units.

The complexity of the downstream units may be further reduced by providing a filter unit and/or signal conditioning device and/or amplifier in the indicating system, since the indicating system already supplies the signal in the required level of processing.

A further integration stage may be achieved by integrating an engine control device into the indicating system, thus allowing the complexity of the necessary hardware to be further reduced.

Such an indicating system may be integrated into an engine control system in a particularly advantageous manner, since the engine control can be directly supplied with the necessary parameters, thus allowing the complexity of the engine control as well as of the sensor system for the engine control to be reduced.

The present invention is explained in greater detail with reference to the schematic, non-limiting FIGS. 1 through 4 which show advantageous exemplary embodiments of the invention.

DETAILED DESCRIPTION OF THE PREFERRED EMBODIMENTS

Figure 1:
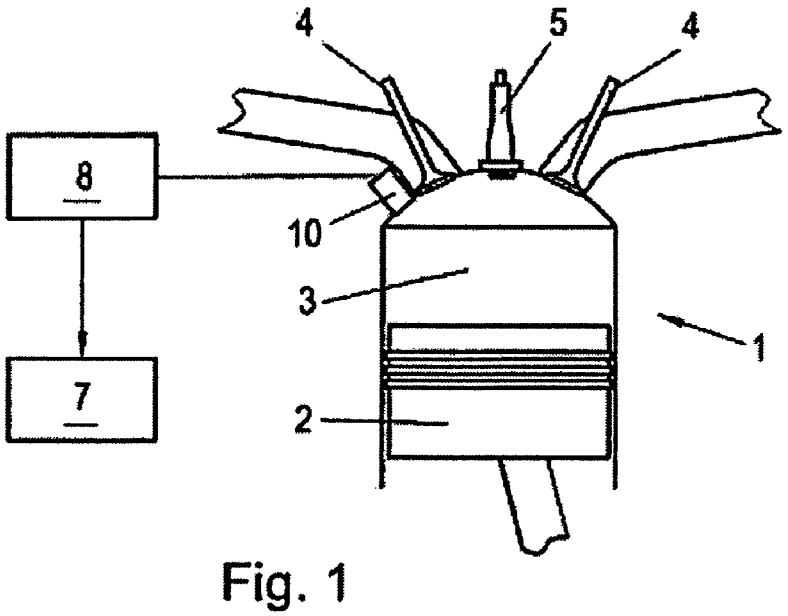
FIG. 1 shows a configuration of the indicating system according to a preferred embodiment of the invention on an engine.

FIG. 1 illustrates a section of a cylinder 1 of an internal combustion engine. A piston 2 is moved in the cylinder cavity 3, and provided in a known manner on the cylinder 1 are valves 4 and, for a spark ignition engine, a spark plug 5, whereby, of course, the invention is also applicable to internal combustion engines using other combustion processes. Also provided on the cylinder 1 is an indicating system 6 comprising a sensor unit 10 and an evaluation unit 8, which in this case respectively measure and evaluate the cylinder pressure, for example. An indicating system is generally understood to mean a system which in a known manner measures and/or evaluates the engine measurement variables, in particular but not limited to the combustion during operation, for example during an operating cycle, with high resolution as a function of time or the crank angle. The indicating system 6 or the evaluation unit 8 for the indicating system 6, as in the present example, may be connected to an engine control device 7 of an engine control system, or to some other processing unit.

Figure 2:
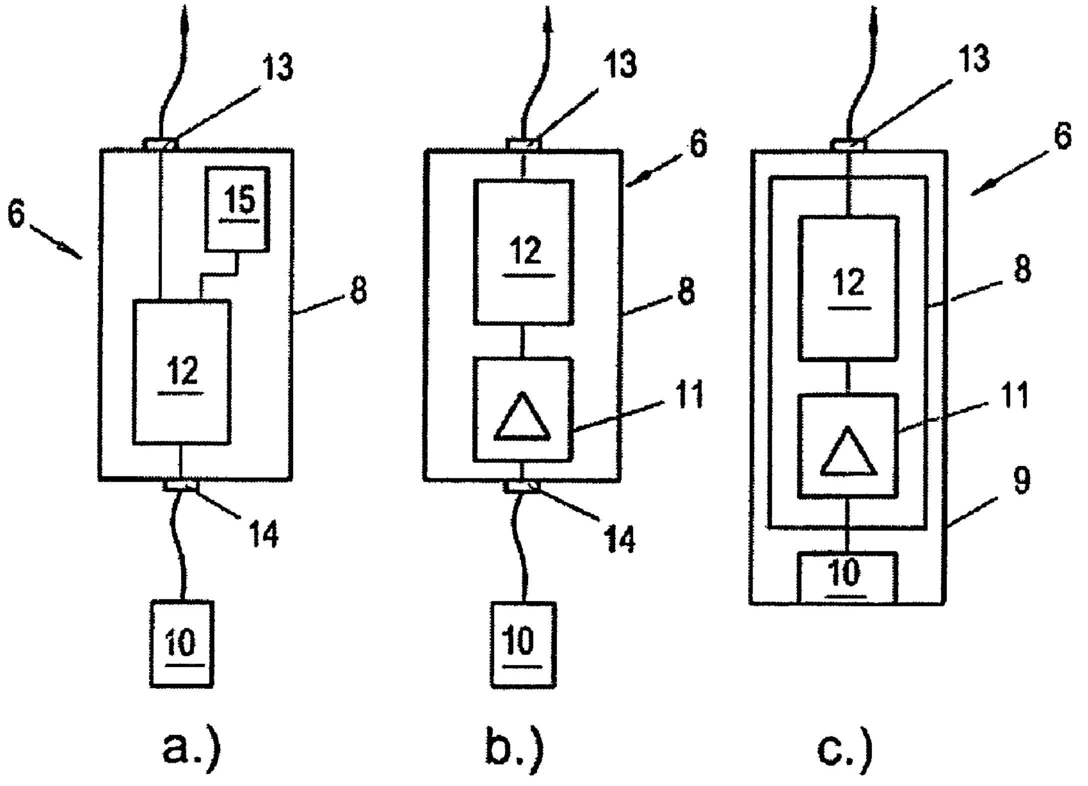
FIG. 2 shows a schematic illustration of various other indicating systems.

As illustrated in detail in FIG. 2*a*, the indicating system 6 comprises a sensor unit 10 for detecting a measured variable, for example a piezoelectric pressure sensor, strain gauge, piezoresistive pressure sensor, structure-borne noise sensor, sensors for sonic and ultrasonic emission analysis, ion current probes, flame radiation sensors, sensors for needle, valve, or piston lift, etc., and an evaluation unit 8. The sensor unit 10 and the evaluation unit 8 are connected to one another via a suitable line, and the signal from the sensor unit 10 is sent to the evaluation unit 8 via an input 14. A computing unit 12, for example a microprocessor or a digital signal processor (DSP), is provided in the evaluation unit 8, by means of which the measured variable, in this case the pressure in the cylinder 1, for example, is processed to produce an engine parameter. Any necessary analog-digital conversion of the measurement signal may take place directly in the computing unit 12 or also upstream from same. The signal processed by the computing unit 12 of the evaluation unit 8 is outputted in analog or digital format to an output 13. In the most simple design, of course, the evaluation unit 8 and the computing unit 12 may also be provided as a single unit.

Likewise, a display device 15 on which a computed engine parameter may be displayed may also be provided on the evaluation unit 8.

A signal amplifier, in particular a charge amplifier 11 for a piezoelectric sensor, may also be provided between the sensor unit 10 and computing unit 12 in a known manner, as illustrated in FIG. 2*b*. The various known signal amplifier circuits may be used, depending on the type of sensors. For piezoelectric sensors, which are used for measuring pressure, force, torque, and acceleration, among other variables, the principle of the charge amplifier (in the strict sense) has become widely established in comparison to electrometer amplifiers and transimpedance amplifiers (voltage-current or charge-current converters, for example). Various circuits are also known for charge amplifiers in the strict sense.

In addition, filter units and/or signal conditioning devices (not illustrated here) may be provided in the indicating system 6, for example in the evaluation unit 8 or between the sensor unit 10 and the evaluation unit 8.

On the basis of the measured variable the computing unit 12 computes crank angle information, for example rotational speed, duration of one revolution of the crankshaft, instantaneous angular velocity, duration of an operating cycle, duration of an operating cycle divided by the number of cylinders, or an instantaneous rotational angle in any given angular resolution, and on the basis of the measured variable and the computed crank angle information determines an engine parameter or an indicating parameter, for example the indicated average pressure, mass conversion points, course of combustion, combustion center of gravity, components of order analysis, ignition delay in degrees of the crank angle, etc. Thus, the indicating system. 6 or the evaluation unit 8 does not require its own crank angle input, and therefore the demands for the required sensor system are very low. The engine parameter determined in this manner and outputted at the output 13, as indicated in FIG. 1, may be sent via a suitable line to an engine control device 7 or another processing unit for further processing. The output signal may be outputted by the evaluation unit 8 in analog as well as digital format.

The computing unit 12 may also be programmed as desired, thus allowing the user to perform any given evaluations of the measured variable. These include the type of determination of the crank angle information as well as which engine parameter(s) is/are determined. On the basis of a measured variable it is also possible, of course, to derive several different crank angle information items, for example in different approximations of accuracy, which together with the measured variable may be evaluated to produce different engine parameters.

Basically, any variable is suitable as a measured variable which contains a component that is dependent on the crank angle, i.e., a variable which is a function of time or of the crank angle, and which may therefore be derived from crank angle information. Of particular interest are variables which have periodicity in the cycle period (for 4 cycles, 720°, and for 2 cycles, 360°), or which at least have such a signal component. Other signal components, in particular those originating from transient operating states of the engine or from external influences, are not suitable for determining the crank angle information. The following are examples of suitable variables: cylinder pressure, flame radiation in the cylinder, ion current in the cylinder, ignition voltage, ignition current, injection pressure, mechanical vibrations, structure-borne noise, airborne noise, for example at the cylinder head or close to the fire deck, or pressure pulses of intake air or exhaust gas. Sensors are known for determining each of these variables. The variables are essentially periodic signals in steady state operation of the engine. In actual operation of an engine, however, the operating states of the engine constantly change as the result of acceleration or deceleration. For example, when the engine is run up or during rapid acceleration, the rotational speed, i.e., the instantaneous angular velocity, within an operating cycle changes, for which reason conventional FFT analyses for evaluating the measured variables frequently fail and more advanced methods must be used, such as the method known from AT 001 519 U for determining the rotational speed in an internal combustion engine.

An engine parameter determined in this manner may be stored in a downstream processing unit as an indicating variable, which, for example, allows subsequent evaluation of the recorded measurement data and parameters of the engine operation. Likewise, use in engine development or engine calibration and engine testing is also possible, for example for combustion design in boundary regions such as knocking or full load for diesel engines, or for improving comfort, for example regarding combustion noise, or simply just for monitoring continuous operation. However, such an engine parameter may also be used for the onboard measuring technique and engine control. For example, the engine parameter could be used to control the engine or certain aspects of the engine (the combustion, for example), or for adaptation to the engine control (from stored characteristic maps, for example) as the result of changing engine conditions. Likewise, a problem in the engine could be identified and indicated by monitoring certain engine parameters.

Of particular importance is the analysis of the energy flow or the creation of an energy or power balance of networked systems with an internal combustion engine, among others. For electrical machines it is comparatively simple to determine the power and energy supplied and discharged on the basis of, for example, the electrically measurable variables of the electrical supply, whereas for internal combustion engines this generally requires mechanical and/or thermodynamic measuring devices having relatively high time resolution, i.e., an indicating equipment which is able to determine the necessary instantaneous values, or, for example, the values averaged over a combustion cycle of the power and energy supplied, and to provide these values for evaluation. Thus, an indicating system according to the invention may be advantageously used for such applications as well.

Of course, besides an engine parameter which is necessary for determining crank angle information, any other given number of engine parameters may also be determined which do not require crank angle information and which may be derived directly from the measured variable. Such engine parameters may in turn be sent to an engine control device 7 or to another processing unit via the output 13.

However, it is also possible to integrate the engine control device 7 into the indicating system 6. The sensor signals may be evaluated by the evaluation unit 8, which may also perform functions for engine control, or these signals may be evaluated directly by the engine control device 7, which generally contains a computing unit such as a microprocessor, for example, in which case an additional evaluation unit 8 in the indicating system 6 could be dispensed with.

Figure 3:
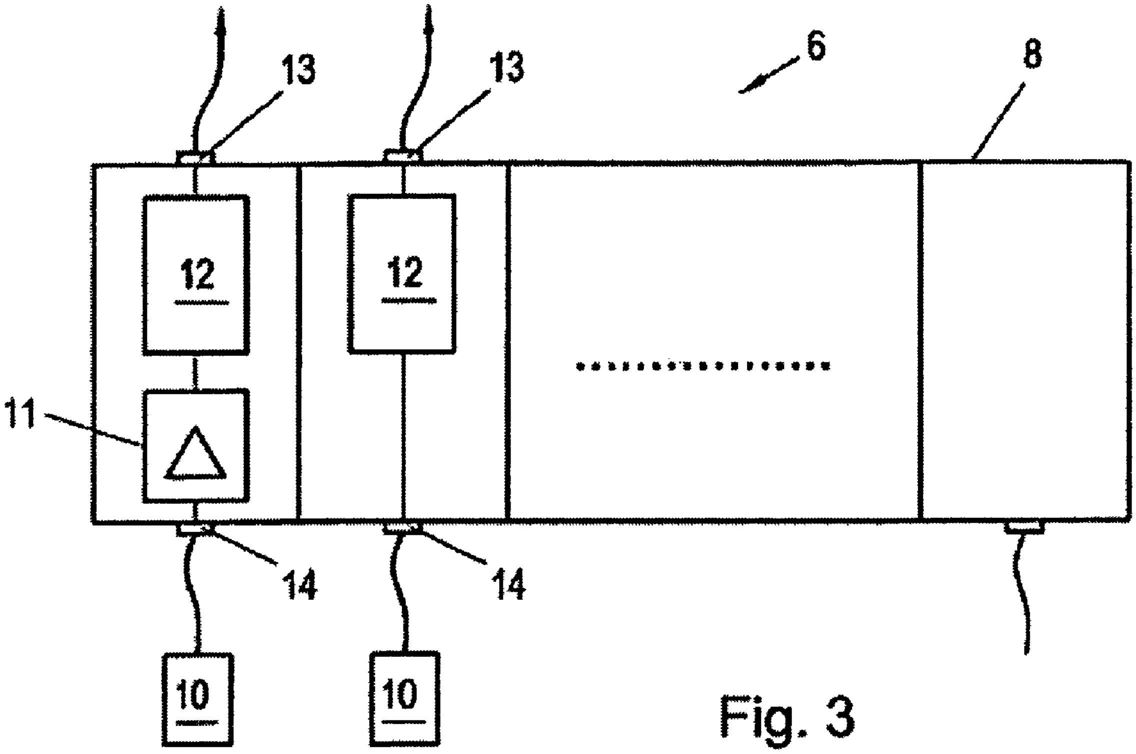
FIGS. 3 and 4 show further examples of an indicating system according to the invention.

Of course, multiple measurement channels for various measured variables may similarly be provided in the evaluation unit 8, as illustrated in FIG. 3, for example. For this purpose an input 14 specific to each measurement channel may be provided on the evaluation unit 8. This allows an indicating system 6 or the evaluation unit 8 to process and evaluate the measured variables from multiple sensor units 10. For example, different sensor units 10 may be situated at various locations in the engine, or, for example, a pressure sensor may be provided on each cylinder for measuring the cylinder pressure. These additional measured variables may in turn be [stored] in the indicating system 6 on the basis of the crank angle, whereby the crank angle information needed for this purpose is once again derived from at least one measured variable, or is evaluated without crank angle information. Of course, for this purpose it may be sufficient to compute crank angle information from only one measured variable. However, it is also possible to compute individual crank angle information for each measured variable.

Figure 4:
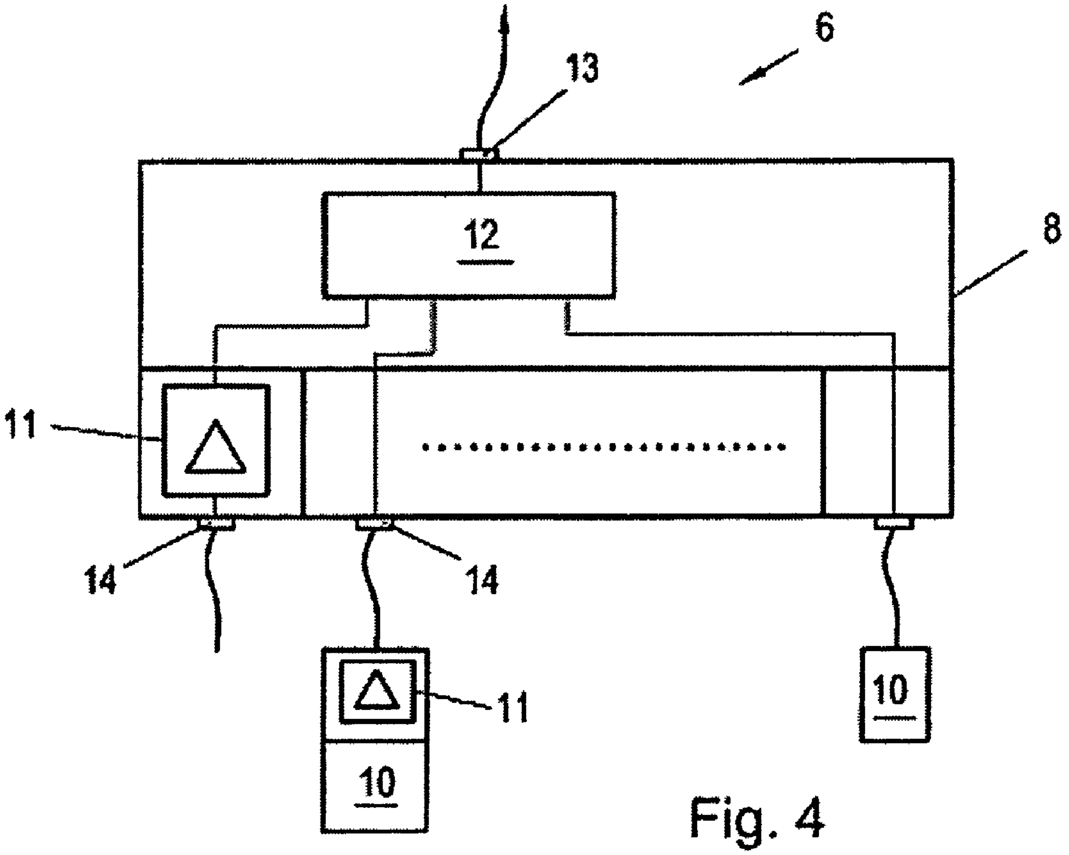

Likewise, a separate computing unit 12 may be provided for each measurement channel in the evaluation unit 8, as illustrated in FIG. 3, or only a single computing unit may be provided for one or a group of measurement channels comprising at least one measurement channel, as illustrated in FIG. 4, for example. Naturally, a charge amplifier 11 which may be necessary can also be provided directly in the sensor unit 10.

Of course, the individual components of the indicating system 6 may also be provided in a common housing 9, as indicated in FIG. 2*c*, and form an "intelligent sensor" which as a compact device may be managed in a particularly simple manner. Such a closed housing 9 also naturally saves on the need for external cabling between the sensor 10 and the computing unit 12. The indicating system 6 itself then contains all units that are necessary for evaluating the measurement signal.

The parameterization of the indicating system 6, evaluation unit 8, or computing unit 12, for example the sensitivity or resolution of the sensor unit 10, may be performed beforehand, as is well known, using compatible software. Independent parameterization could also be provided in which the indicating system 6 or portions thereof are parameterized during a learning process.

An indicating system as described above may be used in internal combustion engines in practically any given configuration and environment, in particular for test benches, for example a research and development test bench or a production test bench, on the internal combustion engine alone, for example as a drive, auxiliary drive, or generator, or in conjunction with other components, such as components of the drive train, the entire drive train, or in the vehicle. Of course, use in large-scale applications (in a manner of speaking, on the highway or on the water, etc.), or in the shop or on the dock, etc., is also possible.

The invention claimed is:

1. An indicating system for determining a parameter of combustion in an internal combustion engine without direct measurement of crank angle of the engine, comprising a sensor unit which records a measured variable having only a component that is dependent on the crank angle, and a computing unit having an input that is connected to the sensor unit and an output that outputs the engine parameter determined in the computing unit, said computer unit receiving as input for determining the parameter of combustion only the measured variable recorded by the sensor unit and computing the engine parameter to the output solely on the basis of the measured variable and crank angle values computed from the measured variable.

2. The indicating system according to claim 1, including a signal amplifier between the sensor unit and the computing unit.

3. The indicating system according to claim 1, including an evaluation unit with multiple inputs for various measurement channels, and including a computing unit for each measurement channel.

4. The indicating system according to claim 1, including an evaluation unit having multiple inputs for various measurement channels, and including a single computing unit for the measurement channels or for a group of measurement channels.

5. The indicating system according to claim 1, including at least one of a filter unit, a signal conditioning device and an amplifier.

6. The indicating system according to claim 1, including a housing system.

7. The indicating system according to claim 1, including an engine control device.

8. The indicating system according to claim 7, wherein including another computing unit for the engine control device as an evaluation unit.

9. An engine control system having an indicating system according to claim 1, wherein the indicating system is connected to an engine control device and supplies the engine control device with said parameter of combustion for controlling the engine.

10. An indicating system according to claim 1, wherein the sensor unit senses variables selected from the group consisting of cylinder pressure, flame radiation in the cylinder, ion current in the cylinder, ignition voltage, ignition current, injection pressure, mechanical vibrations, structure-borne noise, airborne noise at the cylinder head or close to the fire deck, and pressure pulses of intake air or exhaust gas.

11. The indicating system according to claim 1, wherein said sensor unit is selected from the group consisting of a piezoelectric pressure sensor, a strain gauge, a piezoresistive pressure sensor, a structure-borne noise sensor, sensor for sonic and ultrasonic emission analysis, ion current probe, flame sensor, and sensor for needle, valve or piston lift.

12. A method for determining a parameter of combustion in an internal combustion engine without direct measurement of crank angle of the engine, said method comprising steps of:

(a) measuring a variable of engine operation which includes only a component that is dependent on the crank angle, (b) computing crank angle values from the measured variable of step (a), and (c) determining the parameter of combustion exclusively from the measured variable of step (a) and the crank angle values computed in step (b).

13. The method according to claim 12, wherein said variable of engine operation is selected from the group consisting of cylinder pressure, flame in the cylinder, ion current in the cylinder, ignition voltage, ignition current, injection pressure, mechanical vibrations, structure-borne noise, airborne noise, and pressure pulses of intake air or exhaust gases.

14. The method according to claim 13, wherein said crank angle values are selected from the group consisting of rotational speed, duration of single revolution of crankshaft, instantaneous angular velocity, duration of an operating cycle, and instantaneous rotational angle.

15. The method according to claim 14, wherein said parameter of combustion is elected from the group consisting of indexed average pressure, mass conversion points, course of combustion, combustion center of gravity, components of order analysis, and ignition delay in degrees of the crank angle.

* * * * *